(12) United States Patent
Hendriks et al.

(10) Patent No.: US 7,417,935 B2
(45) Date of Patent: Aug. 26, 2008

(54) OPTICAL SYSTEM HAVING AN OBJECTIVE SYSTEM AND AN OPTICAL ABERRATION CORRECTING ELEMENT

(75) Inventors: Bernardus H. W. Hendriks, Eindhoven (NL); Nobuyoshi Mori, Hachioji (JP); Tohru Kimura, Hachioji (JP)

(73) Assignees: Koninklijke Philips Electronics N.V., Eindhoven (NL); Konica Minolta Opto, Inc., Tokyo (JP)

( * ) Notice: Subject to any disclaimer, the term of this patent is extended or adjusted under 35 U.S.C. 154(b) by 397 days.

(21) Appl. No.: 10/874,318

(22) Filed: Jun. 24, 2004

(65) Prior Publication Data
US 2004/0264343 A1    Dec. 30, 2004

(30) Foreign Application Priority Data
Jun. 30, 2003    (JP)    ............... 2003-186335

(51) Int. Cl.
*G11B 7/00*    (2006.01)
(52) U.S. Cl. ............... 369/112.08; 369/112.24
(58) Field of Classification Search ........... None
See application file for complete search history.

(56) References Cited
U.S. PATENT DOCUMENTS
5,629,799 A * 5/1997 Maruyama et al. ......... 359/565

7,133,332 B2 * 11/2006 Kimura .................. 369/44.32
2002/0097504 A1    7/2002 Kitamura et al.

FOREIGN PATENT DOCUMENTS

| EP | 1 199 717 A2 | 4/2002 |
|---|---|---|
| EP | 1 276 104 A2 | 1/2003 |
| EP | 1 300 838 A2 | 4/2003 |
| EP | 1 304 689 A2 | 4/2003 |
| JP | 09-311271 | 12/1997 |
| JP | 11-337818 | 12/1999 |

\* cited by examiner

*Primary Examiner*—Joseph Feild
*Assistant Examiner*—Joseph Haley
(74) *Attorney, Agent, or Firm*—Finnegan, Henderson, Farabow, Garrett & Dunner, L.L.P.

(57) ABSTRACT

An optical system for use in an optical pickup device for recording and/or reproducing information on an optical recording media, the optical system having an optical axis and comprising: an objective system for converging a light beam emitted from a light source on the optical recording media; an optical aberration correcting element comprising two lenses arranged on an optical path between the light source and the objective system and having an adjustable distance in the direction of the optical axis, the optical aberration correcting element comprising a ring-shaped phase structure formed in at least one lens surface of the optical aberration correcting element, and wherein the ring shaped phase structure is non-periodic and comprises a plurality of concentric ring surfaces k (k=1 ... N), and each of the ring surfaces has a step in the direction of the optical axis between the adjacent ring surface.

32 Claims, 6 Drawing Sheets

OPTICAL SYSTEM HAVING AN OBJECTIVE SYSTEM AND AN OPTICAL ABERRATION CORRECTING ELEMENT

BACKGROUND OF THE INVENTION

1. Technical Field

The present invention relates to an optical system, an optical pickup device, and a recording and/or reproducing apparatus for a sound and/or image.

2. Technical Background

Conventionally, an optical disc known as a compact disc (CD) or a digital versatile disc (DVD) has been widely used for the recording of digital data, for example, accumulation of music information and visual information or the recording of computer data.

Therefore, because of the coming of information society, an increase of capacity of optical disc has been recently required strongly.

As to the optical disc, to improve a recording capacity (recording density) of data per unit area, a spot diameter of a converging spot obtained from an optical system for optical pickup is shortened. As well known, the spot diameter is proportional to λ/NA (here, λ denotes wavelength of light emitted from a light source, and NA denotes a numerical aperture of an objective lens). Therefore, to shorten the spot diameter, the shortening of wavelength of light emitted from a light source in the optical pickup device and the heightening of numerical aperture of an objective lens arranged oppositely to the optical disc are effective.

As to the shortening of wavelength in the light source, the research of a blue-violet semiconductor laser emitting a laser beam of wavelength of around 400 nm has been developed and will be put to practical use in near future.

However, in the optical system having the high numerical aperture or the shortened wavelength, an amount of aberration in the whole optical system is easily changed due to non-uniform or partially-changed thickness of a protective layer of the optical disc, a change in wavelength of light emitted from the light source, difference between light sources and/or a change in temperature of the optical system. Therefore, it is difficult to maintain a spot of light having small diameter.

In the optical pickup device, laser power in the recording of information is generally larger than that in the reproduction of information. Therefore, when a reproduction mode is changed to a recording mode, there is a case where mode hopping occurs. In this mode hopping, a central wavelength of light is immediately changed by several nanometers due to a change in output power. A change in focal position caused by the mode hopping can be obviated by focusing an objective lens. However, because it takes several nanoseconds for the focusing of the objective lens, a problem has arisen that the recording of information cannot be correctly performed due to the change in focal position in a period of time of several nanoseconds. The shorter the wavelength of light emitted from the light source is, the larger the change in focal position is. Therefore, the shorter the wavelength of light is, the larger the deterioration of the wave front aberration of the light due to the mode hopping is. Therefore, the optical pickup device using the blue-violet semiconductor laser as the light source requires the correction of the focal position of the converging spot which changes with the wavelength of light.

Also, when an objective lens having the high numerical aperture is made of a plastic lens, there is a probability that an amount of spherical aberration changes due to a change in temperature. In this case, the correction by moving a part of a converging optical system is possible. However, because the change in temperature occurs non-periodically, it is required to always observe the converging spot, the aberration and the temperature per se. As a result, cost of the manufacturing of the device is heightened.

To solve the problem of the change in wavelength, a ring-shaped diffraction pattern is formed on an optical surface of an objective lens, and axial chromatic aberration is corrected by using the diffraction function of the diffraction pattern. Therefore, the change in focal position caused by the change in temperature can be suppressed to a low degree in the optical pickup device using the blue-violet semiconductor laser as the light source. An objective lens of this optical pickup device is disclosed in a Published Unexamined Japanese Patent Application No. H09-311271.

Further, as an optical system relating to the correction for the change in temperature, an objective lens for correcting a change in wavelength of light of a light source caused by the change in temperature by using the diffraction is disclosed in a Published Unexamined Japanese Patent Application No. H11-337818.

However, because the diffraction pattern has a very fine structure, the fabrication of a mold for the objective lens having the diffraction pattern is difficult. Also, a problem has arisen that transmittance of light in the objective lens is easily lowered due to the effect of a fabrication error in the fabrication of the diffraction pattern.

Further, the finer the diffraction pattern is, the larger the effect of the fabrication error on the transmittance of light is. Therefore, because the diffraction pattern in a peripheral portion of the lens is finer than that in a central portion, the objective lens has a transmittance distribution having a low transmittance in the peripheral portion. As a result, a problem has arisen that the converging spot according to the transmittance distribution is enlarged.

SUMMARY

An object of the present invention is to provide, while considering the above-described problems, an optical system for optical pickup, especially suitable for using a blue-violet semiconductor laser as a light source, in which a change in a focal position of a converging spot of light caused by a change in wavelength of the light is corrected in a simple configuration, a change of aberration caused by a change in temperature is corrected, the effect of a fabrication error in shape on transmittance of light is low, and the dependency of light transmittance on wavelength of the light is low.

Further, another object of the present invention is to provide an optical pickup device using the optical system for optical pickup and a recording and/or reproducing apparatus utilizing the optical pickup device.

A still another object of the present invention is to provide an optical system for optical pickup, preferable to an optical pickup device using a blue-violet semiconductor laser as a light source, which is easily manufactured at low cost and preferably corrects a change in a focal position of a converging spot of light caused by a change in wavelength of the light or a change of aberration caused by a change in temperature.

These and an other objects of the present invention can be achieved by following embodiments.

As a first embodiment within the invention is an optical system for use in an optical pickup device for recording and/or reproducing information on an optical recording medium. The optical system has an optical axis. Further, the optical system comprises an objective system for converging a light beam emitted from a light source on the optical recording medium, an optical aberration correcting element including two lenses arranged on an optical path between the light source and the objective system and the optical aberration correcting element having an adjustable distance in the direction of the optical axis. Still further, the optical aberration correcting element comprises a ring-shaped phase structure formed in at least one lens surface of the optical aberration correcting element, and wherein the ring-shaped phase structure is non-periodic and comprises a plurality of concentric ring surfaces k (k=1, - - - , N), each of the ring surfaces has a step in the direction of the optical axis between the adjacent ring surface.

A second embodiment within the present invention is an optical pickup device comprising a light source and the optical system of the present invention.

A third embodiment of the present invention is an recording and/or reproducing apparatus for sound and/or image, comprising:

the optical pickup device of the present invention; and a support member for supporting an optical recording media so as to enable the optical pickup device to record and/or to reproduce an information signal The invention itself, together with further objects and attendant advantages, will best be understood by reference to the following detailed description taken in conjunction with the accompanying drawings.

DESCRIPTION OF THE PREFERRED EMBODIMENTS

In the optical system in the present embodiments, it is preferable that a step distance between ring surfaces k and k+1 is $h_k$, which substantially satisfies the following equation:

$$h_k = m_k \lambda/(n-1)$$

wherein $m_k$ is an integer, $\lambda$ is a wavelength of the light beam emitted from the light source, and n is a refractive index of the material of the ring-shaped phase structure for light beam having a wavelength of $\lambda$.

The optical system in the present embodiments preferably comprises a collimator lens for collimating the light beam emitted from the light source, the collimator lens being arranged between the light source and the optical aberration correcting element.

In the optical system in the present embodiments, it is preferable that the two lenses of the optical aberration correcting element comprise a positive lens and a negative lens.

In the optical system in the present embodiments, it is preferable that steps of the ring surfaces are in the same direction.

In the optical system in the present embodiments, it is preferable that the ring-shaped phase structure is provided on a surface in the optical aberration correcting element nearest to the objective lens and satisfies the following expression:

$$D/rL < 0.1$$

wherein D is a diameter of the entrance pupil of the objective system, and rL is an absolute value of curvature radius of the surface nearest to the objective system.

The optical system in the present embodiments preferably satisfies the following expression:

$$0.2 < (R\Sigma m_k)/(N|f|) < 4 \tag{1}$$

wherein R represents an effective radius of the lens on which the step is provided; $m_k = (n-1)h_k/\lambda$; n represents a refractive index of the material of the ring shaped phase structure for light beam having a wavelength of $\lambda$; $h_k$ represents a step distance between k-th ring surface and k+1-th ring surface; $\lambda$ represents a wavelength of the light beam emitted form the light source; $\Sigma m_k$ represents a summation about all of the step distances; N represents a number of ring surfaces within the effective radius; and f represents a focal length of the lens on which the step is provided.

In the optical system in the present embodiments, it is preferable that the number of the ring surfaces N is 4 to 30.

In the optical system in the present embodiments, it is preferable that a wavelength of the light emitted from the light source is not more than 500 nm and the steps are shifted in a direction in which the lens thickness increases as a function of the distance from the optical axis.

In the optical system in the present embodiments, it is preferable that a numerical aperture NA of the objective system is not less than 0.7, and the optical system further comprises a lens driving means for controlling an amount of spherical aberration caused in the optical pickup device by changing the distance between the two lenses of the optical aberration correcting element.

It is preferable that the optical system in the present embodiments is made of a plastic material, and a numerical aperture NA of the objective system is not less than 0.7, and the step distances are designed to correct an amount of spherical aberration caused by a change in temperature.

It is preferable that the optical system in the present embodiments is made of a plastic material, a numerical aperture NA of the objective system is not less than 0.7, and the steps are shifted in a direction in which the lens thickness decreases as a function of the distance from the optical axis to decrease an amount of spherical aberration caused by a change in temperature.

It is preferable that the optical system in the present embodiments comprises two plastic lenses, a numerical aperture NA of the objective system is not less than 0.7, and the steps are shifted in a direction in which the lens thickness increases as a function of the distance from the optical axis to decrease an amount of spherical aberration caused by a change in temperature.

Figure 2:
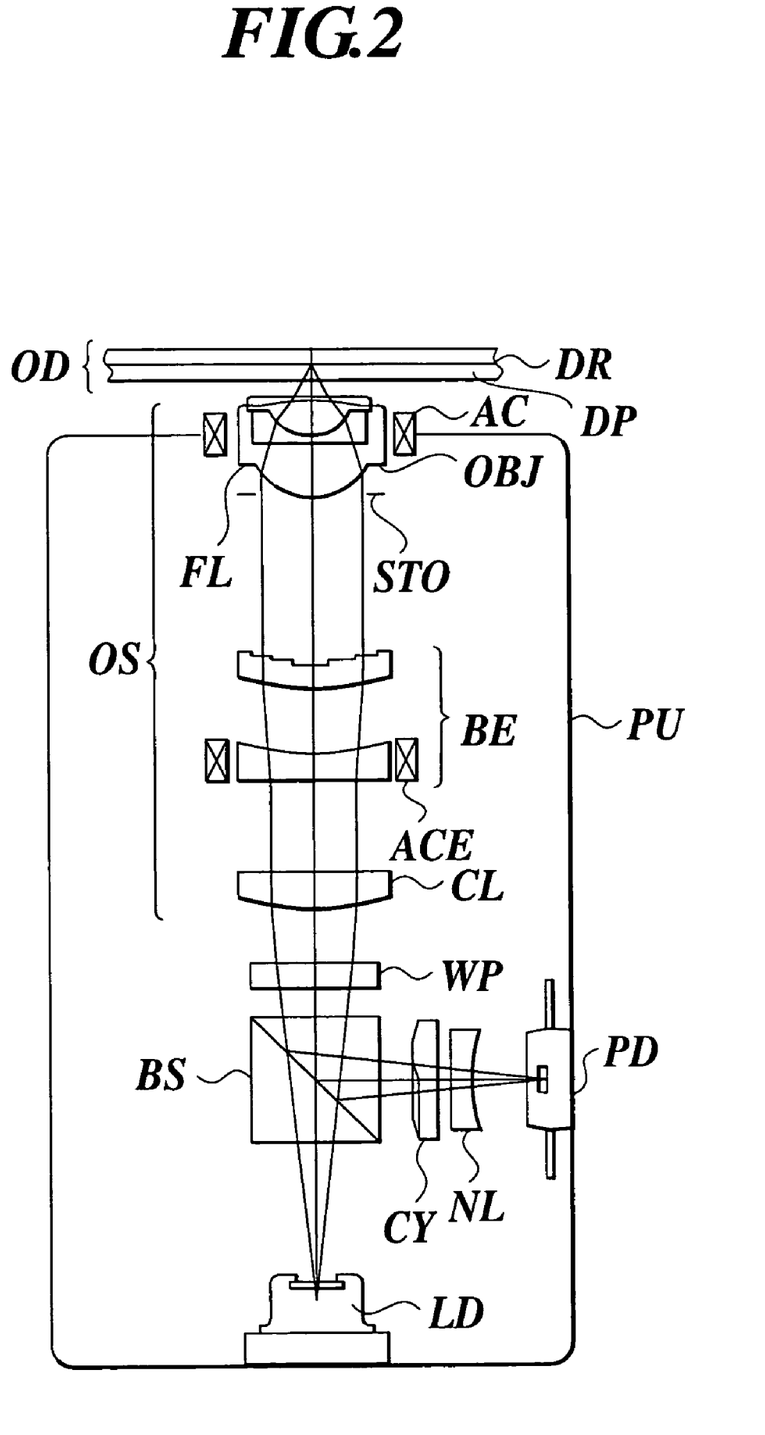
FIG. 2 is a sectional view of main elements showing the configuration of an optical pickup device.
Figure 3:
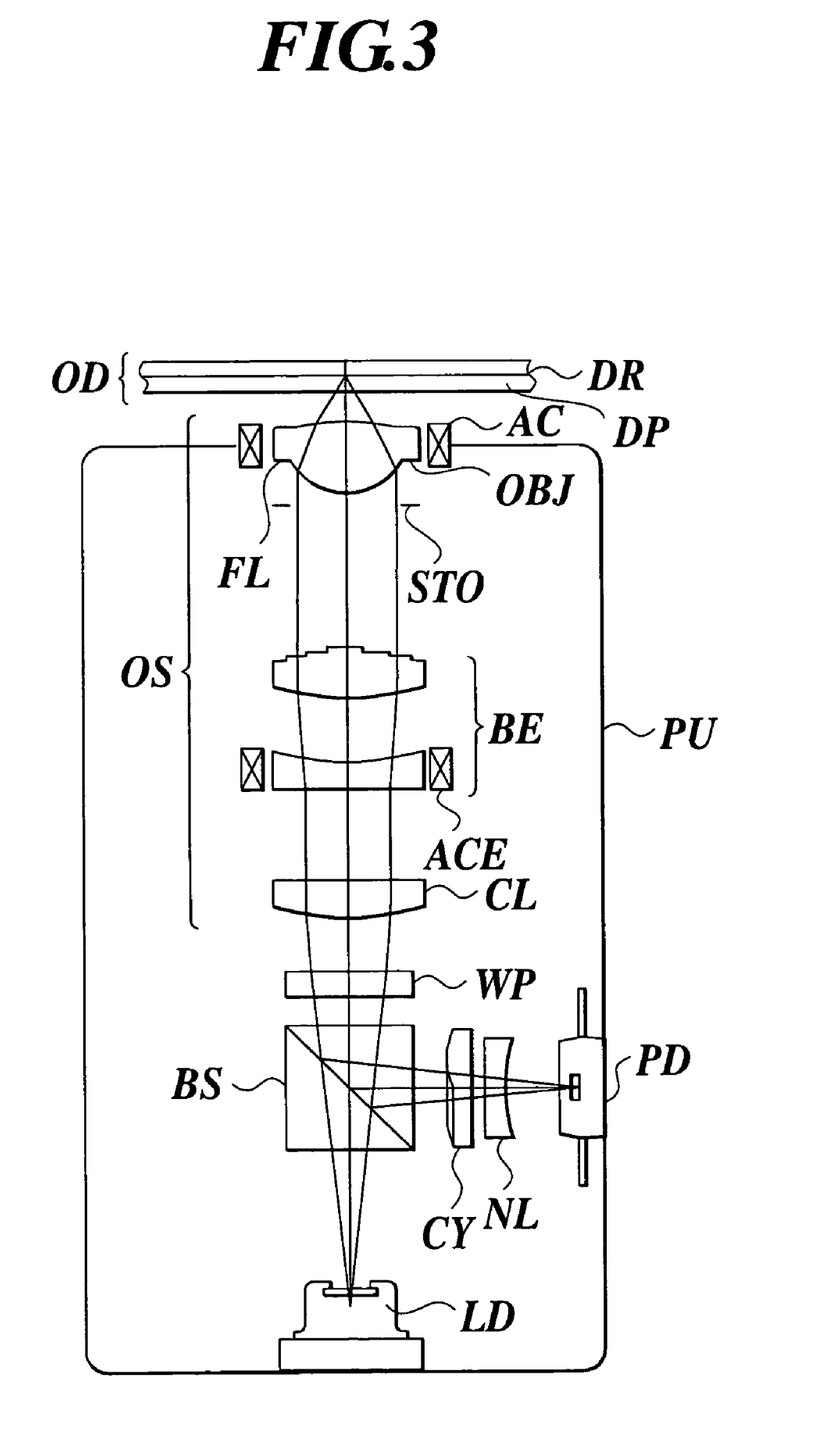
FIG. 3 is a sectional view of main elements showing the configuration of an optical pickup device.

Hereinafter, preferable embodiments of an optical pickup device having an optical system OS for optical pickup according to the present invention are explained with reference to drawings. FIGS. 2 and 3 are respectively a schematic constitutional view of an optical pickup device PU according to this embodiment. The optical pickup device PU comprises a semiconductor laser LD acting as a light source as shown in FIG. 2 or 3.

The semiconductor laser LD is a GaN system blue-violet semiconductor laser or an SHG blue-violet semiconductor laser emitting a light beam of wavelength of around 400 nm. A diverged light beam emitted from the semiconductor laser LD is transmitted through a polarized beam splitter BS and is changed to a circular polarized light beam in a quarter-wave plate WP. Thereafter, a parallel light beam is obtained in a collimator lens CL.

The parallel light beam passes through an optical aberration correcting element BE, which comprises a positive lens and a negative lens and is in a beam expander form, and passes through a stop STO. Thereafter, the light beam forms a converging spot on an information recording plane DR by an objective lens (objective system) OBJ through a protective layer DP of an optical disc (optical recording medium) OD.

A one-axis actuator ACE is arranged around a group of concave lenses of the optical aberration correcting element BE. When the group of concave lenses is moved in a direction of an optical axis, an incident light beam on the objective lens is changed to a converged or diverged light beam slightly converged or diverged as compared with the parallel light beam. Therefore, spherical aberration generated by a change in thickness of the protective layer, a change in wavelength of light emitted from the laser LD, a change in temperature of the optical system and/or an interval of layers of a double-layer disc can be corrected.

The objective lens OBJ is driven in a focus direction and a tracking direction by a two-axis actuator AC arranged around the objective lens. A numerical aperture of the objective lens OBJ on a side of the optical disc OD is set to around 0.85, and a flange portion FL of the objective lens OBJ can be fitted to the optical pickup device PU with high accuracy. Here, no ring-shaped phase structure is formed on the objective lens OBJ.

A reflected light beam modulated in an information pit of the information recording plane DR is again transmitted through the objective lens OBJ, the stop STO and the optical aberration correcting element BE and is changed to a converged light beam by the collimator lens CL. The converged light beam is changed to a linearly polarized light beam by the quarter-wave plate WP, is reflected on the polarized beam splitter BS and passes through a cylindrical lens CY and a concave lens NL so as to have astigmatism. Thereafter, the light beam is incident on a light receiving plane of a photo-detector PD. Thereafter, the recording and/or reproducing of information is performed in an optical disc OD by using a focus error signal, a tracking error signal and an RF signal produced according to an output signal of the photo-detector PD.

Also, an optical information recording and reproducing apparatus according to the present invention comprises the optical pickup device PU and an optical recording medium supporting means (not shown) for supporting the optical disc OD to enable the optical pickup device PU to record and reproduce information in/from the optical disc OD. The optical recording medium supporting means comprises a rotationally operating device for performing a rotational operation of the optical disc OD while supporting the center of the optical disc OD.

In the optical pickup device PU and the optical information recording and reproducing apparatus, an optical surface of at least one lens of lenses composing the optical aberration correcting element BE has a plurality of ring surfaces divided each other through fine steps. In each pair of adjacent ring surfaces composed of an inner ring surface (near to the optical axis) and an outer ring surface (far from the optical axis), the offset (or step) in the direction of the optical axis is provided at a boundary between the ring surfaces to make an optical path length in the outer ring surface be longer or be shorter than that in the inner ring surface and to form a ring-shaped phase structure acting as a phase addition structure. In this ring-shaped phase structure, a prescribed phase difference equal to approximately an integral multiple of $2\pi$ is generated between an incident light beam of a prescribed wavelength passing through the outer ring surface and the incident light beam passing through the inner ring surface.

In detail, when a prescribed wavelength $\lambda$, a refractive index n of the lens having the ring-shaped structure for the wavelength $\lambda$, the step distance $\Delta_k$ between ring surfaces adjacent to each other and a phase difference $\Phi_k$ generated due to the offset $\Delta_k$ are used, all offsets $\Delta_k$ are set so as to satisfy a following formula (2) using an integer $m_k$.

$$\Phi_k = 2\pi(n-1)\Delta k/\lambda \approx 2\pi m_k \quad (2)$$

Therefore, when the light beam of the wavelength $\lambda$ passes through the ring surfaces, differences in wave fronts of the light beam at the boundaries of the ring surfaces are lessened, and the high order wave front aberration can be suppressed. This idea can be applied, in the same manner, in case of the consideration of a change in refractive index of lens caused by a change in environment temperature. That is, a high temperature most often occurring is set as a reference temperature, and the offsets $\Delta_k$ of the ring-shaped phase structure are set so as to set $\Phi_k$ which is calculated by using the refractive index and the wavelength at the reference temperature, to an integral multiple of $2\pi$.

In case of the optical system for optical pickup shown in FIG. 2, the ring-shaped phase structure is provided on a surface of a lens nearest to the objective lens OBJ of the optical aberration correcting element. The chromatic aberration mainly generated by the objective lens OBJ can be suppressed due to the action of the ring-shaped phase structure. When a light beam of a wavelength longer than the prescribed wavelength $\lambda$ is incident on the objective lens OBJ, because the refractive index of the lens is lowered, a focal point of the light beam is moved in a direction so as to be away from the lens. In contrast, when the light beam of the wavelength longer than the prescribed wavelength $\lambda$ is incident on the ring-shaped phase structure, each wave front of a ray of light passing through each ring surface is slightly shifted in the direction of the optical axis so as to be close to the objective lens OBJ. Therefore, the whole light beam has an approximately converged spherical wave in the ring-shaped phase structure when the offsets are disregarded, and the focal point of the light beam is moved in a direction so as to approach the objective lens OBJ when the light beam is incident on the objective lens OBJ. When a variation $\Delta\lambda$ in wavelength is used, a variation $\Delta\Phi$ in phase of light is expressed in a following formula F1.

$$\Delta\Phi = 2\pi m \left( \frac{\frac{\partial n}{\partial \lambda}\Delta\lambda}{n-1} - \frac{\Delta\lambda}{\lambda} \right) \cong -2\pi m \frac{\Delta\lambda}{\lambda} \quad \text{F1}$$

Therefore, the wave front of the ray of light passing through a lens portion which is comparatively thick in the direction of the optical axis, is shifted so as to be nearer to the objective lens OBJ according to the offsets. Because the effect of the ring-shaped phase structure cancels out the effect of the objective lens OBJ, the chromatic aberration in the whole optical system can be suppressed.

Also, when a change ΔT in temperature is considered, a change of phase caused by a change in temperature is expressed in a following formula F2.

$$\Delta\Phi = 2\pi m \left( \alpha + \frac{\frac{\partial n}{\partial T}}{n-1} \right) \Delta T \quad \text{F2}$$

Here, α denotes linear expansion coefficient. Because the term in parentheses is a negative value in case of the fabrication of the lens from plastic material, when the temperature is heightened, an approximately converged spherical wave is generated in the same manner. Therefore, over-corrected spherical aberration is generated in the objective lens OBJ. When the objective lens OBJ comprises two plastic lenses respectively having the positive refractive power, under-corrected spherical aberration is likely to be generated in the objective lens OBJ with the heightening of the temperature. Therefore, these effects are cancelled, and a change of aberration caused by the change in the temperature of the optical system can be suppressed.

Another embodiment of the optical system OS for optical pickup according to the present invention is shown in FIG. 3. The objective lens OBJ comprises a single plastic lens. The optical aberration correcting element BE has a plurality of ring surfaces divided each other through fine steps on an optical surface of a lens placed nearest to the objective lens OBJ. However, in this example, the steps are provided so that the optical path length in the outer ring surface (far from the optical axis) is shorter than that in the inner ring surface (near to the optical axis).

Also, a ring-shaped phase structure acting as a phase addition structure is formed so as to generate a prescribed phase difference equal to approximately an integral multiple of 2π between an incident light beam of a prescribed wavelength at the reference temperature, which passes through the outer ring surface and the incident light beam passing through the inner ring surface. Therefore, the all offsets $\Delta_k$ of the ring surfaces are set so as to satisfy the formula (2).

Therefore, the differences in wave fronts of the light beam passing through the ring surfaces at the reference temperature are lessened at the boundaries of the ring surfaces, and the high order wave front aberration can be suppressed. Also, a change in phase of the light at the temperature of the ring-shaped phase structure is expressed in the formula (F2). Also, an approximately diverged spherical wave is generated with the heightening of temperature. In the objective lens OBJ comprising the single plastic lens, over-corrected spherical aberration is generated with the heightening of temperature. Therefore, these effects are cancelled, and a change of aberration caused by the change in the temperature of the optical system can be suppressed.

To correct the spherical aberration, as described above, there is a method for generating an approximately spherical wave in the ring-shaped phase structure from the wave front of light to be incident on the objective lens OBJ. Alternatively, there is a method for generating spherical aberration to be directly corrected in the ring-shaped phase structure of a lens. In this case, the direction of steps between the ring surfaces is reversed between the optical axis and the periphery of the lens. However, when the spherical aberration generated in the objective lens OBJ is corrected by the method, the effect of each shift of the objective lens OBJ and the optical aberration correcting element is large. Therefore, the tracking characteristic of the objective lens OBJ deteriorates.

Figure 4:
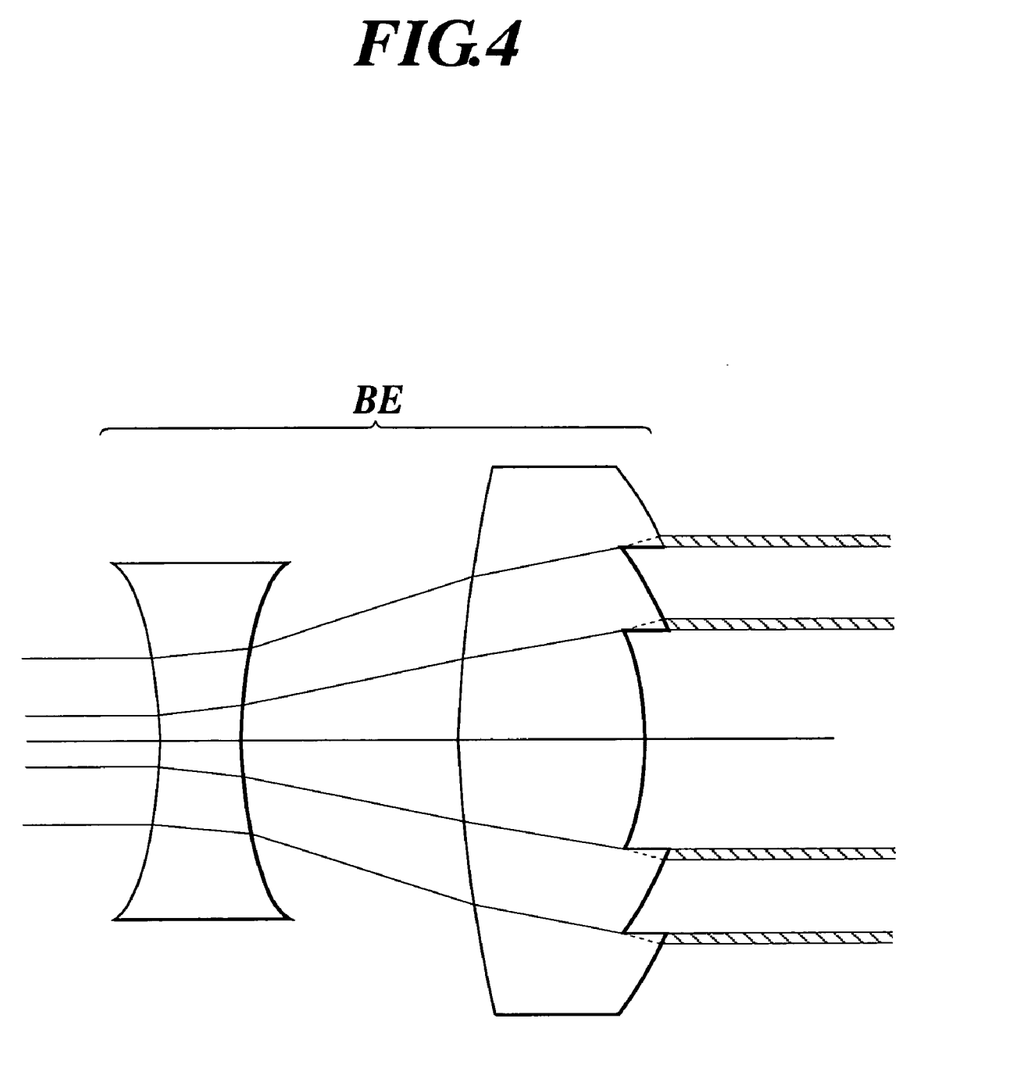
FIG. 4 is a sectional view of main elements explaining the configuration of a ring-shaped phase structure.

Also, the ring-shaped phase structure is preferably formed so as to satisfy the expression (1). When (RΣm$_k$)/(N|f|) is lower than the lower limit of the expression (1), the number of ring surfaces is excessively large, the fabrication of the structure is very difficult, or the correction performance is too small to sufficiently obtain the effect of the ring-shaped phase structure. In contrast, when (RΣm$_k$)/(N|f|) is higher than the upper limit of the expression (1), the step between each pair of ring surfaces is excessively large, and, as shown by shadowed portions in FIG. 4, a plurality of ring-shaped significant light non-passing areas are undesirably produced in the transmitted light beam. In this case, when light reflected on the disc is incident on a sensor, a pupil distribution of rays of discontinuous transmission light influences on the light detection so as to prevent the sensor from correctly detecting the reflected light.

To decrease the light non-passing areas, the ring-shaped phase structure is arranged on the surface nearest to the objective lens OBJ in the optical aberration correcting element, and the absolute value rL of the curvature radius of the surface nearest to the objective lens OBJ is set so as to satisfy D/rL<0.1 for a diameter D of the entrance pupil of the objective lens. In this case, rays of light transmitted through the ring-shaped phase structure are approximately parallel to each other, and rays of light are hardly incident on side surfaces of the steps of the ring-shaped phase structure. Therefore, the light non-passing areas are decreased.

Also, the correction performance of the ring-shaped phase structure and a step distance of the step are set so as to set the number of ring surfaces within 4 to 30. In this case, the ring-shaped phase structure can be easily fabricated, and an optical system for optical pickup, in which the light non-passing areas have low influence on the sensor, can be obtained.

Also, when the wavelength of light emitted from the light source is lower than or equal to 500 nm, the chromatic aberration is increased in the objective lens. However, when the ring-shaped phase structure having steps are arranged on one surface of the lens of the optical aberration correcting element so as to increase the thickness of the lens gradually along the direction from the optical axis to the periphery of the lens, the deterioration of wave front aberration caused by the chromatic aberration can be suppressed.

Further, when the numerical aperture NA of the objective lens is equal to or higher than 0.7, a change in spherical aberration due to a disturbance for light based on a change in the thickness of the protective layer becomes large. However, when a group of lenses in the optical aberration correcting element is set to be movable in the direction of the optical axis, the change in the spherical aberration can be corrected.

Also, the recording and/or reproduction of information in high density can be performed in an optical pickup device having the optical system for optical pickup.

EXAMPLES

An example preferable as the above-described optical system OS for optical pickup is now presented. Lens data is shown in Table 1.

TABLE 1

Example 1

| Surface No. | r(mm) | d(mm) | n(405 nm) | n(406 nm) | νd | Remarks |
|---|---|---|---|---|---|---|
| 0 | | 13.032 | | | | Light source |
| 1 | 6.8383 | 1.5 | 1.52469 | 1.52454 | 56.5 | Collimator lens |
| 2 | ∞ | 5 | | | | |
| 3 | ∞ | 0.8 | 1.52469 | 1.52454 | 56.5 | Optical aberration correcting element |
| 4 | 6.30455 | 3.0 (variable) | | | | |
| 5 | 7.87864 | 1.0 | 1.52469 | 1.52454 | 56.5 | |
| 6 | ∞ | 10 | | | | |
| 7 | 2.0993 | 2.5 | 1.52469 | 1.52454 | 56.5 | Objective lens |
| 8 | 7.4878 | 0.05 | | | | |
| 9 | 0.8495 | 1.1 | 1.52469 | 1.52454 | 56.5 | |
| 10 | ∞ | 0.2396 | | | | |
| 11 | ∞ | 0.1 | 1.61950 | 1.61909 | 30.0 | Protective layer |
| 12 | ∞ | | | | | |

Coefficients of aspherical surface

| | First surface | Fourth surface | Fifth surface | Seventh surface | Eighth surface | Ninth surface |
|---|---|---|---|---|---|---|
| κ | +1.4455 × 10⁻¹ | −2.1586 × 10⁻¹ | −5.6860 × 10⁻¹ | −1.2962 × 10⁻¹ | +4.2122 × 10⁺¹ | −7.5218 × 10⁻¹ |
| A4 | −9.6010 × 10⁻⁴ | −6.0124 × 10⁻⁴ | −2.6386 × 10⁻³ | −3.3246 × 10⁻³ | +7.0525 × 10⁻³ | +1.3349 × 10⁻¹ |
| A6 | 0.0 | +4.1482 × 10⁻⁶ | +1.8361 × 10⁻⁶ | −6.2010 × 10⁻⁵ | −1.8316 × 10⁻² | +8.6490 × 10⁻³ |
| A8 | 0.0 | 0.0 | 0.0 | −5.1594 × 10⁻⁴ | +9.1215 × 10⁻³ | +2.1567 × 10⁻¹ |
| A10 | 0.0 | 0.0 | 0.0 | −1.1806 × 10⁻⁴ | −6.4308 × 10⁻³ | −1.0997 × 10⁻¹ |
| A12 | 0.0 | 0.0 | 0.0 | −6.6480 × 10⁻⁵ | −7.4409 × 10⁻³ | 0.0 |
| A14 | 0.0 | 0.0 | 0.0 | +1.2115 × 10⁻⁴ | 0.0 | 0.0 |
| A16 | 0.0 | 0.0 | 0.0 | −3.9441 × 10⁻⁵ | 0.0 | 0.0 |
| A18 | 0.0 | 0.0 | 0.0 | 0.0 | 0.0 | 0.0 |
| A20 | 0.0 | 0.0 | 0.0 | 0.0 | 0.0 | 0.0 |

In Example 1, design wavelength of 405 nm, focal length of 1.76 mm in the objective lens OBJ, numerical aperture of 0.85 in the objective lens OBJ and diameter of 3.0 mm in the entrance pupil of the objective lens OBJ are set. Focal length of 13.03 mm in the collimator lens CL is set. Also, the optical aberration correcting element BE is formed of a 1.25 times beam expander.

The coefficients of aspherical surface in each optical surface are expressed in a following formula F3 by using a displacement X (mm) from a plane surface circumscribing a vertex of the aspherical surface, a height h (mm) in a direction perpendicular to the optical axis, curvature radius r (mm), conic constant κ and coefficients $A_{2i}$ of aspherical surface.

$$X = \frac{\frac{h^2}{r}}{1 + \sqrt{1 - (1+\kappa)\frac{h^2}{r^2}}} + \sum_{i=2}^{10} A_{2i} h^{2i} \quad \text{F3}$$

Also, in Table 1, r(mm) denotes a curvature radius of each optical surface, d(mm) denotes an interval on the optical axis, n(405 nm) denotes a refractive index at the design wavelength of 405 nm, n(406 nm) denotes a refractive index at the design wavelength of 406 nm, and νd denotes the Abbe number at d-line.

Figure 1:
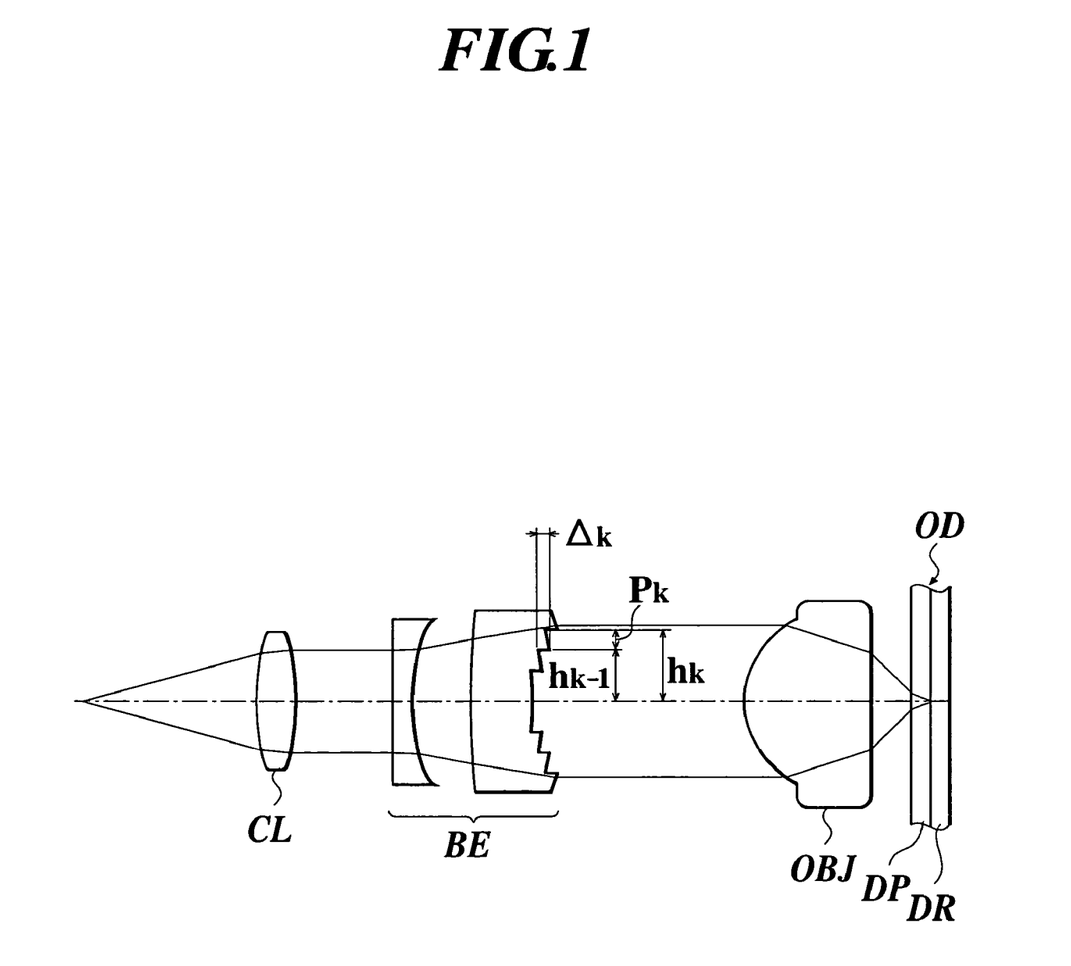
FIG. 1 is a sectional view of main elements showing the configuration of an optical pickup device.

In Example 1, an optical surface (fifth surface in Table 1) of a positive lens facing toward the light source in the optical aberration correcting element BE is set to a plane surface, and the ring-shaped phase structure is formed on the optical surface. Step distance $\Delta_k$ (μm) of each step, distance $h_k$(mm) from the optical axis of each step and width $P_k$(mm) of ring surface in a direction perpendicular to the optical axis (refer to FIG. 1) are shown in Table 2. Here, an effective radius of the surface having the steps is equal to the distance $h_k$ of the final ring surface.

TABLE 2

| Ring surface No. | $h_{k-1}$ | $h_k$ | $\Delta_k$ | $m_k$ | $P_k$ (mm) |
|---|---|---|---|---|---|
| 1 | 0.00 | 0.75 | 0.00 | 0 | 0.75 |
| 2 | 0.75 | 1.05 | 12.35 | 16 | 0.3 |
| 3 | 1.05 | 1.25 | 15.43 | 20 | 0.2 |
| 4 | 1.25 | 1.40 | 15.45 | 20 | 0.15 |
| 5 | 1.40 | 1.49 | 13.89 | 18 | 0.09 |
| 6 | 1.49 | 1.55 | 16.98 | 22 | 0.06 |

Axial chromatic aberration remains in the objective lens OBJ. Assuming that a change in wavelength of a blue-violet semiconductor laser caused by the mode hopping is 1 nm, the focal position is changed so as to be away from the objective lens OBJ by 0.26 μm ($\Delta F_{OBJ}$=0.26 μm) because of a change in wavelength from 405 nm to 406 nm. As a result, the wave front aberration deteriorates by a change in focal position from 0.001 λrms to 0.083 λrms.

In contrast, when a light beam is incident on the optical aberration correcting element BE arranged as shown in FIG. 2, the optical aberration correcting element BE has a wavelength dependency based on the action of the ring-shaped phase structure shown in Table 2, in which the focal position approaches the objective lens OBJ as the wavelength of the incident light beam is lengthened. The focal position approaches the objective lens OBJ by 11.15 μm in case of a change in wavelength from 405 nm to 406 nm (ΔF=−11.15 μm).

Therefore, a displacement of the focal position in case of a change in wavelength from 405 nm to 406 nm can be suppressed to 0.1 μm (ΔF$_{OS}$=0.1 μm) by combining the optical aberration correcting element BE and the objective lens OBJ. In this case, the wave front aberration including defocusing component is 0.036 λrms. As described above, the change in the focal position of the converging spot caused by the change in wavelength can be preferably changed.

Figure 5:
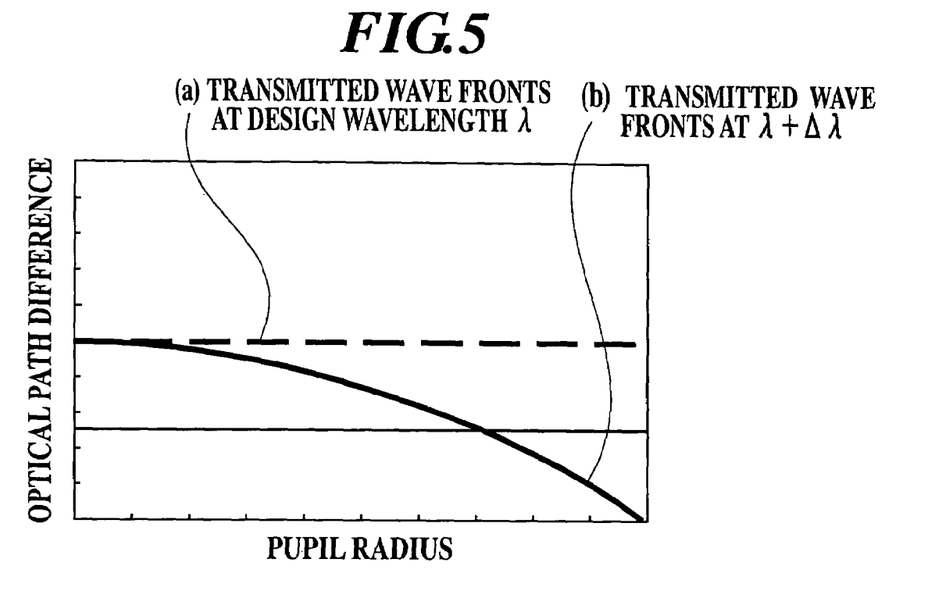
FIG. 5 is a graph explaining a principle of correction of a change in focal position in a ring-shaped phase structure.

A principle of correcting the change in the focal position of the converging spot caused by the change in wavelength according to the ring-shaped phase structure formed in the optical aberration correcting element BE will be described with reference to drawings. FIG. 5 is a graph showing a transmitted wave front of the light beam having a design wavelength λ(nm) and a transmitted wave front of the light beam having a wavelength longer than the design wavelength λ(nm) by a prescribed wavelength Δλ(nm) when the light beam is incident on the objective lens OBJ. The X-axis indicates a pupil radius, and the Y-axis indicates an optical path difference. When a light beam having a wavelength λ+Δλ (nm) is incident on the objective lens OBJ, a wave front of the light is changed because of the change in focal position caused by the axial chromatic aberration of the objective lens OBJ as shown in FIG. 5(*b*).

Figure 6:
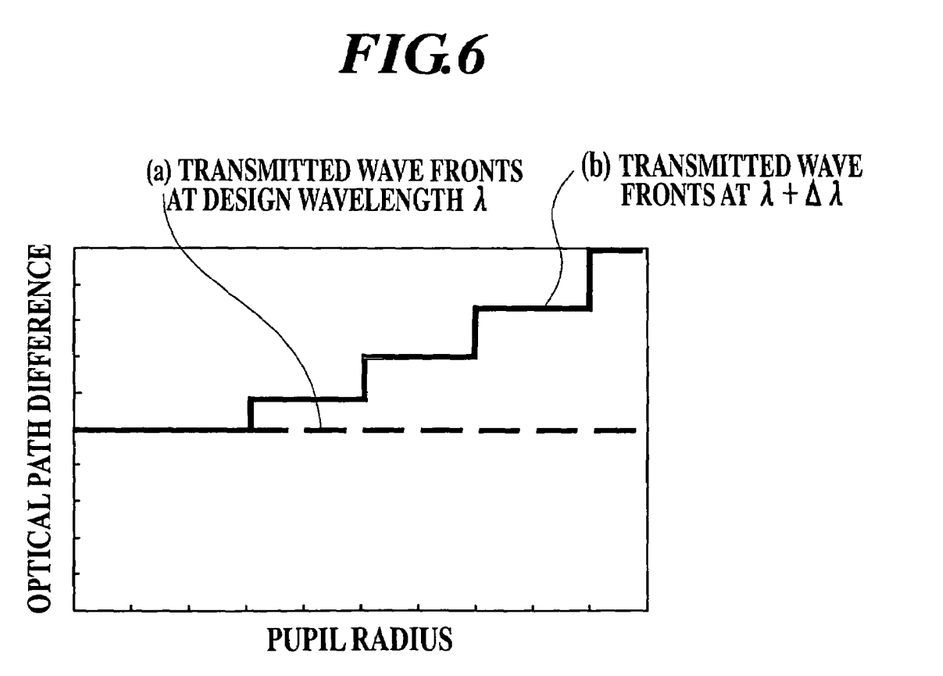
FIG. 6 is a graph explaining a principle of correction of a change in focal position in a ring-shaped phase structure.

In contrast, FIG. 6 is a graph showing a transmitted wave front of the light beam having the design wavelength λ(nm) and a transmitted wave front of the light beam having a wavelength longer than the design wavelength λ(nm) by the prescribed wavelength Δλ(nm) when the light beam is incident on the optical aberration correcting element BE. When the light beam having the design wavelength λ(nm) is incident on the optical aberration correcting element BE, because the optical path difference between ring surfaces adjacent to each other is equal to an integral multiple of the design wavelength, the transmitted wave front of the light transmitted through the optical aberration correcting element BE has no aberration. In contrast, when the light beam having the wavelength λ+Δλ(nm) is incident on the optical aberration correcting element BE, because the optical path difference between ring surfaces adjacent to each other is not equal to an integral multiple of the wavelength λ+Δλ(nm) because of the change in wavelength and the change in refractive index caused by the change in wavelength, the optical path difference is added stepwise to the wave fronts of the light transmitted through the ring surfaces of the optical aberration correcting element BE as shown in FIG. 6(*b*). As shown in FIG. 2, the outer ring surface (far from the optical axis) is shifted in the direction of the optical axis at a boundary between the outer ring surfaces and the inner ring surface (near to the optical axis) so that the optical path length of the outer ring surface is longer than that of the inner ring surface. Therefore, when the light beam having the wavelength λ+Δλ(nm) is incident on the optical aberration correcting element BE, a sign of the optical path difference added to the transmitted wave front of the light transmitted through the optical aberration correcting element BE is inverse to a sign of the optical path difference added to the transmitted wave front of the light transmitted through the objective lens OBJ.

Figure 7:
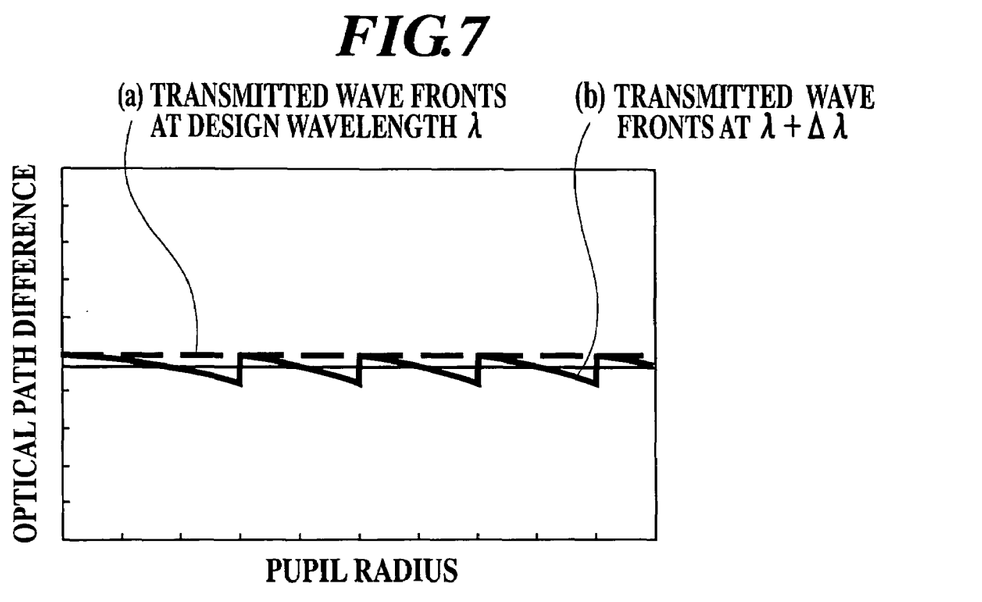
FIG. 7 is a graph explaining a principle of correction of a change in focal position in a ring-shaped phase structure.

As a result, when the light beam having the wavelength λ+Δλ(nm) is incident on the optical aberration correcting element BE, the optical path difference of the transmitted wave front of the light transmitted through the optical aberration correcting element BE can cancel out that of the transmitted wave front of the light transmitted through the objective lens OBJ. Therefore, as shown in FIG. 7, the light transmitted through both the optical aberration correcting element BE and the objective lens OBJ has overall a wave front including no optical path difference. Because of the above-described principle, when the objective lens OBJ converges light transmitted through the optical aberration correcting element BE on a converging spot, the change in the focal position of the converging spot caused by the change in wavelength of the light can be suppressed to a small degree by the ring-shaped phase structure of the optical aberration correcting element BE.

Here, in this specification, "focal position" denotes an image forming position at which the wave front aberration measured or calculated is minimized while considering the shape of wave front in the whole pupil, and is distinguished from an image forming position calculated from paraxial data such as "back focus" or "axial chromatic aberration".

Also, as described above, because the transmittance of light is considerably lowered by the shading, it is not preferable that the ring-shaped phase structure correcting the change in the focal position of the converging spot caused by the change in wavelength be formed on the optical surface of the objective lens OBJ of which the curvature radius is inclined to be shortened to achieve a high numerical aperture. In contrast, in the optical system OS for optical pickup according to the present invention, the ring-shaped phase structure correcting the change in the focal position of the converging spot caused by the change in wavelength is formed in the optical aberration correcting element BE in which no high numerical aperture is required and a large curvature radius of the optical surface can be secured. Therefore, the transmittance of light is not lowered so much by the shading.

Also, in the ring-shaped phase structure formed in the optical aberration correcting element BE, a distance $\Delta_k$ (μm) (refer to FIG. 1) of an arbitrary k-th step numbered from the side near to the optical axis is determined so as to set the optical path difference between adjacent ring surfaces to an integral multiple of the design wavelength when the light beam having the design wavelength λ(nm) is incident on the optical aberration correcting element BE. This determination is equivalent to a case where the step of the ring-shaped phase structure satisfies a following condition. That is, when the refractive index n of the optical aberration correcting element BE at the design wavelength λ(nm) is set, $m_k$ is a natural number expressed formulas $m_k$=INT(X) and X=$\Delta_k$×(n−1)/(λ×10$^{-3}$). Here, INT(X) denotes an integer obtained by rounding off X.

Values of Examples corresponding to the optical pickup device shown in FIG. 3 are shown in Table 3 and Table 4.

TABLE 3

Example 2

| Surface No. | r(mm) | d(mm) | n (450 nm) | n (406 nm) | νd | Remarks |
|---|---|---|---|---|---|---|
| 0 |  | 13.032 |  |  |  | Light source |
| 1 | 6.8383 | 1.5 | 1.52469 | 1.52454 | 56.5 | Collimator lens |
| 2 | ∞ | 5 |  |  |  |  |
| 3 | ∞ | 0.8 | 1.52469 | 1.52454 | 56.5 | Optical aberration correcting element |
| 4 | 6.30455 | 3.0 (variable) |  |  |  |  |
| 5 | 7.87864 | 1.0 | 1.52469 | 1.52454 | 56.5 |  |
| 6 | ∞ | 10 |  |  |  |  |
| 7 | 1.1833 | 2.25 | 1.56013 | 1.55997 | 56.5 | Objective lens |
| 8 | −1.90451 | 0.49 |  |  |  |  |
| 9 | ∞ | 0.1 | 1.61950 | 1.61909 | 30.0 | Protective layer |
| 10 | ∞ |  |  |  |  |  |

Coefficients of aspherical surface

| | First surface | Fourth surface | Fifth surface | Seventh surface | Eighth surface |
|---|---|---|---|---|---|
| κ | $+1.4455 \times 10^{-1}$ | $-2.1586 \times 10^{-1}$ | $-5.6860 \times 10^{-1}$ | $-6.9846 \times 10^{-1}$ | $-4.4660 \times 10^{+1}$ |
| A4 | $-9.6010 \times 10^{-4}$ | $-6.0124 \times 10^{-4}$ | $-2.6386 \times 10^{-3}$ | $+1.7884 \times 10^{-2}$ | $+1.7603 \times 10^{-1}$ |
| A6 | 0.0 | $+4.1482 \times 10^{-6}$ | $+1.8361 \times 10^{-6}$ | $+6.4131 \times 10^{-3}$ | $-2.7548 \times 10^{-1}$ |
| A8 | 0.0 | 0.0 | 0.0 | $-3.5779 \times 10^{-3}$ | $+3.1965 \times 10^{-1}$ |
| A10 | 0.0 | 0.0 | 0.0 | $+4.4492 \times 10^{-3}$ | $-2.9680 \times 10^{-1}$ |
| A12 | 0.0 | 0.0 | 0.0 | $-6.1774 \times 10^{-4}$ | $+1.6620 \times 10^{-1}$ |
| A14 | 0.0 | 0.0 | 0.0 | $-8.0581 \times 10^{-4}$ | $-3.9257 \times 10^{-2}$ |
| A16 | 0.0 | 0.0 | 0.0 | $+1.6547 \times 10^{-4}$ | 0.0 |
| A18 | 0.0 | 0.0 | 0.0 | $+2.1142 \times 10^{-4}$ | 0.0 |
| A20 | 0.0 | 0.0 | 0.0 | $-7.2030 \times 10^{-5}$ | 0.0 |

TABLE 4

| Ring surface No. | $h_{k-1}$ | $h_k$ | Δk | $m_k$ | $P_k$(mm) |
|---|---|---|---|---|---|
| 1 | 0.00 | 0.38 | 0.00 | 0 | 0.38 |
| 2 | 0.38 | 0.56 | 32.41 | 42 | 0.28 |
| 3 | 0.56 | 0.68 | 37.03 | 48 | 0.12 |
| 4 | 0.68 | 0.78 | 33.18 | 43 | 0.10 |
| 5 | 0.78 | 0.86 | 32.41 | 42 | 0.09 |
| 6 | 0.86 | 0.94 | 29.32 | 38 | 0.08 |
| 7 | 0.94 | 1.02 | 31.63 | 41 | 0.08 |
| 8 | 1.02 | 1.1 | 34.72 | 45 | 0.08 |
| 9 | 1.1 | 1.18 | 37.81 | 49 | 0.08 |
| 10 | 1.18 | 1.25 | 40.89 | 53 | 0.07 |
| 11 | 1.25 | 1.32 | 37.81 | 49 | 0.07 |
| 12 | 1.32 | 1.38 | 37.81 | 49 | 0.06 |
| 13 | 1.38 | 1.44 | 36.26 | 47 | 0.06 |
| 14 | 1.44 | 1.5 | 37.81 | 49 | 0.06 |

In Example 2, the objective lens OBJ is made of a single plastic ball having a diameter Φ=3 mm of entrance pupil and numerical aperture NA of 0.85. In the same manner as in Example 1, the collimator lens CL and the optical aberration correcting element BE are arranged. The ring-shaped phase structure is arranged on a surface of a lens of the optical aberration correcting element BE nearest to the objective lens. The steps of the ring surfaces are set so as to thin the lens along the direction from the optical axis to the periphery of the lens. The surface of the lens is overall a convex surface having a large curvature radius. Also, the ring-shaped phase structure is partitioned into 14 surface portions, and each surface portion is perpendicular to the optical axis.

The action of the ring-shaped phase structure will be described with reference to FIG. 8. In case of no ring-shaped phase structure, the refractive index of the plastic lens composing the optical system is lowered with the increase of temperature. As a result, the over-corrected spherical aberration is generated mainly in the objective lens. In Example 2, the aberration of 0.12 λRMS is generated due to the increase of the temperature by 30° C. Though the aberration can be corrected by moving a part of the optical aberration correcting element along the optical axis to slightly change the magnification of the objective lens in use, it is required to detect temperature or spherical aberration generated in spots.

In Example 2, as indicated in Table 4, because the ring-shaped phase structure is arranged so as to decrease the thickness of the lens in the periphery of the lens, spherical aberration caused by a change in temperature can be corrected without moving the optical aberration correcting element.

Figure 8:
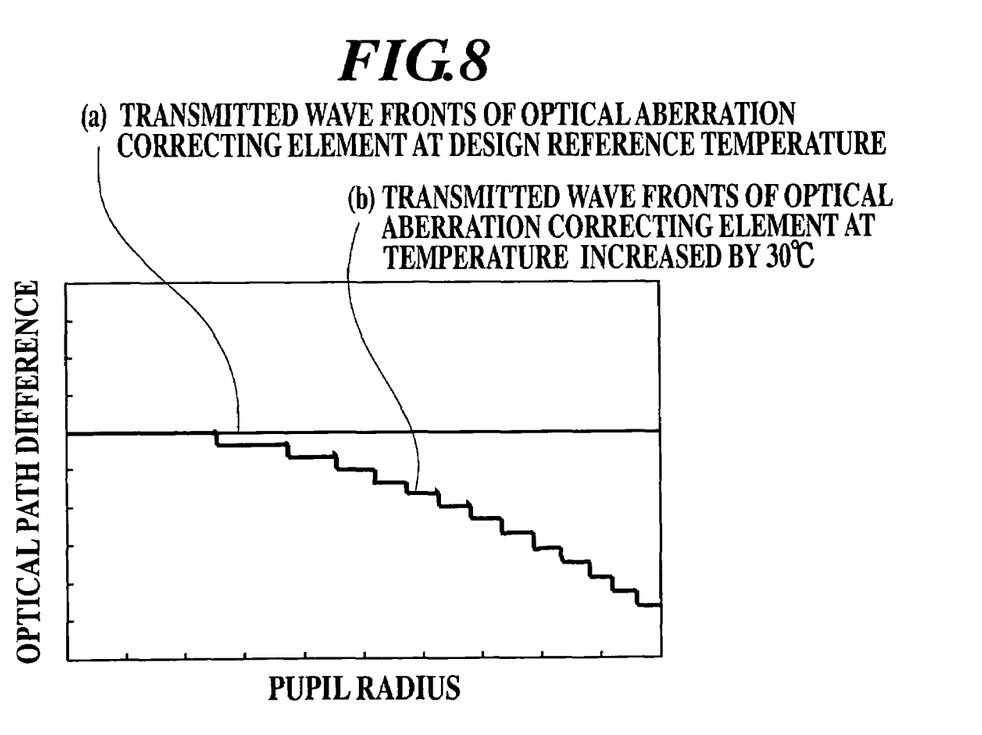
FIG. 8 is a graph explaining a principle of correction of a change in focal position in a ring-shaped phase structure.

A transmitted wave front of light transmitted through the optical aberration correcting element in a reference state and a transmitted wave front of the light in the increase of temperature by 30° C. are shown in FIG. 8. At the reference temperature, the wave fronts passing through each ring surface have the optical path difference equal to an integral multiple of the wavelength as shown (a), and the wave fronts make a uniform plane wave. In contrast, when the temperature is increased by 30° C., the optical path difference of the wave fronts emitted from the ring surfaces is shifted from an integral multiple of the wavelength due to the lowering of the refractive index of the lens caused by the change in temperature. Therefore, as shown in FIG. 8(b), the wave fronts emitted from the optical aberration correcting element is overall changed to a diverged spherical wave.

This action of the optical aberration correcting element is substantially the same as the movement of a part of lenses of the optical aberration correcting element and slightly changes the magnification of the objective lens in use. As a result, the wave front aberration in the whole optical system is corrected to around 0.01 λRMS, and the spherical aberration generated in the plastic objective lens because of a change in temperature can be corrected without detecting temperature or spherical aberration. Though the correction in the whole optical system can be improved by increasing a sum of step distances of the steps of the ring-shaped phase structure, each step distance becomes excessively large so as to widen the light non-passing areas, and the number of ring surfaces is increased so as to make difficult the fabrication of the ring-shaped phase structure.

In the present invention, in an optical system for optical pickup, using a blue-violet semiconductor laser as a light source, the correction of a change in the focal position of the converging spot of light caused by a change in the wavelength of the light and the correction of a change of aberration caused by a change in temperature can be performed in a simple configuration. Also, an optical system for optical pickup can be obtained so as to reduce the effect of the manufacturing error in the shape of the system on the transmittance of the light and reduce the dependency of the light transmittance on wavelength. Also, an optical pickup device using the optical system for optical pickup and a recording and reproducing apparatus having the optical pickup device can be obtained.

Also, in an optical system for optical pickup preferable to an optical pickup device using a blue-violet semiconductor laser as a light source, the optical system for optical pickup can be obtained on condition that the optical system can be easily manufactured at low cost and can preferably correct a change in the focal position of the converging spot of light caused by a change of the wavelength of the light or a change of aberration caused by a change in temperature.

What is claimed is:

1. An optical system for use in an optical pickup device for recording and/or reproducing information on an optical recording media, the optical system having an optical axis and comprising:
    an objective system for converging a light beam emitted from a light source on the optical recording media;
    an optical aberration correcting element comprising two lenses arranged on an optical path between the light source and the objective system and having an adjustable distance in the direction of the optical axis;
    wherein the optical aberration correcting element comprises a ring-shaped phase structure formed in at least one lens surface of the optical aberration correcting element, and wherein the ring shaped phase structure is non-periodic and comprises a plurality of concentric ring surfaces k (k=1...N), and each of the ring surfaces has a step in the direction of the optical axis between the adjacent ring surface; and
    wherein the ring-shaped phase structure is provided on a surface in the optical aberration correcting element nearest to the objective system and satisfies the following expression:

$D/rL < 0.1$ wherein D represents a diameter of the entrance pupil of the objective system; and rL represents an absolute value of curvature radius of the surface nearest to the objective system.

2. The optical system of claim 1
    wherein a step distance between ring surfaces k and k+1 is $h_k$, which substantially satisfies the following equation:

$h_k = m_k \lambda/(n-1)$ wherein $m_k$ represents an integer; λ represents a wavelength of the light beam emitted from the light source; and n represents a refractive index of the material of the ring shaped phase structure for a light beam having a wavelength of λ.

3. The optical system of claim 1, comprising a collimator lens for collimating the light beam emitted from the light source, the collimator lens being arranged between the light source and the optical aberration correcting element.

4. The optical system of claim 1,
    wherein the two lenses of the optical aberration correcting element comprise a positive lens and a negative lens.

5. The optical system of claim 1, wherein the steps of the ring surface are in the same direction.

6. An optical system for use in an optical pickup device for recording and/or reproducing information on an optical recording media, the optical system having an optical axis and comprising:
    an objective system for converging a light beam emitted from a light source on the optical recording media;
    an optical aberration correcting element comprising two lenses arranged on an optical path between the light source and the objective system and having an adjustable distance in the direction of the optical axis;
    wherein the optical aberration correcting element comprises a ring-shaped phase structure formed in at least one lens surface of the optical aberration correcting element, and wherein the ring shaped phase structure is non-periodic and comprises a plurality of concentric ring surfaces k (k=1...N), and each of the ring surfaces has a step in the direction of the optical axis between the adjacent ring surface; and
    wherein the optical system satisfies the following expression;

$0.2 < (R \Sigma m_k)/(N|f|) < 4$ wherein R represents an effective radius of the lens on which the step is provided; $m_k$ represents $(n-1) h_k/\lambda$; n represents a refractive index of the material of the ring shaped phase structure for light beam having a wavelength of λ; $h_k$ represents a step distance between k-th ring surface and k+1-th ring surface; λ represents a wavelength of the light beam emitted form the light source; $\Sigma m_k$ represents a summation about all of the step distances; N represents a number of ring surfaces within the effective radius; and f represents a focal length of the lens on which the step is provided.

7. The optical system of claim 6, wherein the number of the ring surfaces N is within the range of 4 to 30.

8. The optical system of claim 2, wherein a wavelength of the light emitted from the light source is smaller than or equal to 500 nm and the steps are shifted in a direction in which the lens thickness increases as a function of the distance from the optical axis.

9. The optical system of claim 2, wherein a numerical aperture NA of the objective system is larger than or equal to 0.7 and further comprising a lens driving means for controlling an amount of spherical aberration caused in the optical pickup device by changing the distance between the two lenses of the optical aberration correcting element.

10. The optical system of claim 2, wherein the objective system is made of a plastic material and a numerical aperture NA of the objective system is larger than or equal to 0.7, and the step distances are designed to correct an amount of a spherical aberration caused by a change in temperature.

11. The optical system of claim 2, wherein the objective system is made of a plastic material and an numerical aperture NA of the objective lens is larger than or equal to 0.7, and wherein the steps are shifted in a direction in which the lens thickness increases as a function of the distance from the optical axis to decrease an amount of a spherical aberration by a change in temperature.

12. The optical system of claim 2, wherein the objective system comprises two plastic lenses and a numerical aperture NA of the objective lens is larger than or equal to 0.7; wherein the steps are shifted discretely in a direction in which the lens thickness increases as a function of the distance from the optical axis to decrease an amount of a spherical aberration by changing a temperature.

13. An optical pickup device comprising:
a light source; and
the optical system described in claim 2.

14. A recording and/or reproducing apparatus for sound and/or image, comprising:
an optical pickup device described in claim 13; and
a supporting member for supporting an optcial recording media so as to enable the optical pickup device to record and/or reproduce an information signal.

15. The optical system of claim 1, wherein a wavelength of the light emitted from the light source is smaller than or equal to 500 nm and the steps are shifted in a direction in which the lens thickness increases as a function of the distance from the optical axis.

16. The optical system of claim 6, wherein a wavelength of the light emitted from the light source is smaller than or equal to 500 nm and the steps are shifted in a direction in which the lens thickness increases as a function of the distance from the optical axis.

17. The optical system of claim 1, wherein a numerical aperture NA of the objective system is larger than or equal to 0.7 and further comprising a lens driving means for controlling an amount of spherical aberration caused in the optical pickup device by changing the distance between the two lenses of the optical aberration correcting element.

18. The optical system of claim 6, wherein a numerical aperture NA of the objective system is larger than or equal to 0.7 and further comprising a lens driving means for controlling an amount of spherical aberration caused in the optical pickup device by changing the distance between the two lenses of the optical aberration correcting element.

19. The optical system of claim 1, wherein the objective system is made of a plastic material and a numerical aperture NA of the objective system is larger than or equal to 0.7 m, and the step distances are designed to correct an amount of a spherical aberration caused by a change in temperature.

20. The optical system of claim 6, wherein the objective system is made of a plastic material and a numerical aperture NA of the objective system is larger than or equal to 0.7, and the step distances are designed to correct an amount of a spherical aberration caused by a change in temperature.

21. The optical system of claim 1, wherein the objective system is made of a plastic material and an numerical aperture NA of the objective lens is larger than or equal to 0.7, and wherein the steps are shifted in a direction in which the lens thickness increases as a function of the distance from the optical axis to decrease an amount of a spherical aberration by a change in temperature.

22. The optical system of claim 6, wherein the objective system is made of a plastic material and an numerical aperture NA of the objective lens is larger than or equal to 0.7, and wherein the steps are shifted in a direction in which the lens thickness increases as a function of the distance from the optical axis to decrease an amount of a spherical aberration by a change in temperature.

23. The optical system of claim 1, wherein the objective system comprises two plastic lenses and a numerical aperture NA of the objective lens is larger than or equal to 0.7; wherein the steps are shifted discretely in a direction in which the lens thickness increases as a function of the distance from the optical axis to decrease an amount of a spherical aberration by changing a temperature.

24. The optical system of claim 6, wherein the objective system comprises two plastic lenses and a numerical aperture NA of the objective lens is larger than or equal to 0.7; wherein the steps are shifted discretely in a direction in which the lens thickness increases as a function of the distance from the optical axis to decrease an amount of a spherical aberration by changing a temperature.

25. An optical pickup device comprising:
a light source; and
the optical system described in claim 1.

26. An optical pickup device comprising:
a light source; and
the optical system described in claim 6.

27. A recording and/or reproducing apparatus for sound and/or image, comprising:
an optical pickup device described in claim 25; and
a supporting member for supporting an optical recording member for supporting an optical recording media so as to enable the optical pickup device to record and/or reproduce an information signal.

28. A recording and/or reproducing apparatus for sound and/or image, comprising:
an optical pickup device described in claim 26; and
a supporting member for supporting an optical recording media so as to enable the optical pickup device to record and/or reproduce an information signal.

29. The optical system of claim 6
wherein $h_k$ substantially satisfies the following equation:

$$h_k = m_k \lambda / (n-1)$$

wherein $m_k$ represents an integer.

30. The optical system of claim 6, comprising a collimator lens for collimating the light beam emitted from the light source, the collimator lens being arranged between the light source and the optical aberration correcting element.

31. The optical system of claim 6,
wherein the two lenses of the optical aberration correcting element comprise a positive lens and a negative lens.

32. The optical system of claim 6, wherein the steps of the ring surface are in the same direction.

* * * * *